Patented Feb. 8, 1927.

1,616,936

UNITED STATES PATENT OFFICE.

MORRIS L. WEISS, OF NEWARK, NEW JERSEY, ASSIGNOR TO DOVAN CHEMICAL CORPORATION, OF NEW YORK, N. Y., A CORPORATION OF NEW YORK.

PROCESS FOR VULCANIZING RUBBER AND PRODUCTS OBTAINED THEREBY.

No Drawing. Application filed July 29, 1925, Serial No. 46,876. Renewed November 5, 1926.

This invention relates to processes for vulcanizing rubber and similar materials and to the products obtained thereby, and is more particularly directed to acceleration of vulcanization by a class of substituted guanidines.

In my previous Patent No. 1,411,231 granted March 28, 1922, I have described the vulcanization of rubber employing substituted guanidines, such as diphenyl guanidine, as accelerators. In my application Serial No. 490,746, filed August 8, 1921, I have described the employment of substituted guanidines obtained from primary aromatic amines containing hydrocarbon residues comprising alkyl groups in the ortho position, such as symmetrical diortho tolyl guanidine. These substances are valuable accelerators and effect notable economies in the vulcanizing process and in the products obtained. I have also experimented with a tri-substituted guanidine having the formula

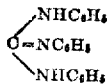

but I have found that this material when compounded in a formula similar to that employed with diphenyl guanidine and diortho tolyl guanidine is a relatively weak accelerator.

One object of the present invention, accordingly, is to provide a strong, stable, non-toxic accelerator of vulcanization of the tri-substituted type of compound heretofore regarded as only a weak accelerator.

Another object is to provide a simple process of vulcanization employing such an accelerator and to produce a series of useful products thereby.

According to the present invention I have found that unsymmetrical tri-substituted guanidines having the formula

where R is an aryl radical constitute a group of valuable accelerators of vulcanization. It will be noted in this formula that an imid group NH is present, which according to my observations is largely responsible for the accelerating properties of this material. It will be noted in the formula for the symmetrical tri-substituted guanidine that the imid group is missing. As soon as this imid group disappears apparently the accelerating power is greatly reduced so that the substance is no longer in the same class as the accelerators diphenyl guanidine and diortho tolyl guanidine. Both of the latter contain imid groups, and in the case of each it has been observed that its peculiar accelerating characteristics are due to the presence of this group.

The invention accordingly comprises combining rubber with a substituted guanidine including an imid group and having at least three of the four remaining hydrogens substituted by aryl groups, e. g. an unsymmetrical tri-aryl substituted guanidine as a vulcanizing ingredient and vulcanizing the rubber. In using the expression "as a vulcanizing ingredient" I mean that the unsymmetrical tri-substituted guanidine is a component part of a combination or mixture which is used to effect vulcanization and which ordinarily includes sulphur and may and preferably does include zinc oxide or equivalent thereof.

In carrying out the invention in its preferred form 100 pounds of rubber—first latex crepe—50 pounds of zinc oxide, 3 pounds of sulphur and 0.75 pounds of beta triphenyl guanidine, an unsymmetrical tri-substituted guanidine having the formula

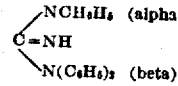

are combined preferably in the usual manner by milling. The compound is placed in a mold and heated at 40 pounds per square inch steam pressure for 60 minutes at the end of which time a satisfactory vulcanization is secured.

I give below a table showing results which I have obtained upon the same lot of rubber and other ingredients in which, however, the accelerator beta tri-phenyl guanidine is substituted by the same amount of symmetrical tri-phenyl guanidine, the same amount of diphenyl guanidine and the same amount of diortho tolyl guanidine with the results secured upon vulcanization for 30, 45 and 60 minutes at 40 pounds per square inch steam pressure:

| Accelerator used | 30 minutes tensile elong. | 45 minutes tensile elong. | 60 minutes tensile elong. |
|---|---|---|---|
| Symmetrical triphenyl guanidine | 949 lbs. 773% | 1,543 lbs. 810% | 1,660 lbs. 790% |
| Diphenylguanidine | 3,050 lbs. 750% | 3,600 lbs. 760% | 3,850 lbs. 750% |
| Diortho tolyl guanidine | 3,240 lbs. 775% | 4,050 lbs. 765% | 4,185 lbs. 710% |
| Beta triphenylguanidine | 3,197 lbs. 755% | 3,790 lbs. 725% | 3,795 lbs. 710% |

Beta triphenyl guanidine is thus shown to be a strong accelerator. It is non-toxic and stable. The process of vulcanization employing it is simple and efficient.

The compound used in the above was as follows:

100 lbs. 1st latex crepe, 50 lbs. XX zinc oxide, 3 lbs. sulphur, ¾ lb. accelerator.

Unsymmetrical or beta tri-phenyl guanidine is prepared according to W. Weith and B. Schroeder, Berichte der Deutschen Chem. Gesell., vol. 8, page 294 as follows:

One mol. cyananilide or phenylcyanamide, $C_6H_5NH.CN$, is mixed with an excess over one mol. of diphenyl amine hydrochloride,

and heated slowly. At about 80° C. the reaction sets in, as evidenced by a quick rise in temperature. The flame is removed as the temperature rises above 100° C. and the mixture is brought to about 105° C. The heating is then continued at 105° C. for about 2 hrs. The temperature is then raised to about 125° C. and kept there for 15 minutes.

The reaction product, a viscous mass, is then boiled up with water several times and filtered. The filtrate is then poured into a dilute caustic soda solution with stirring and the guanidine first precipitates out as a gummy mass but soon becomes crystalline. This is filtered off, washed and dried. M. P. 127° C. On recrystallization from alcohol, isometric plates are obtained. M. P. 131° C. The product is easily soluble in alcohol and ether, insoluble in water and forms easily soluble salts. The reaction is as follows:

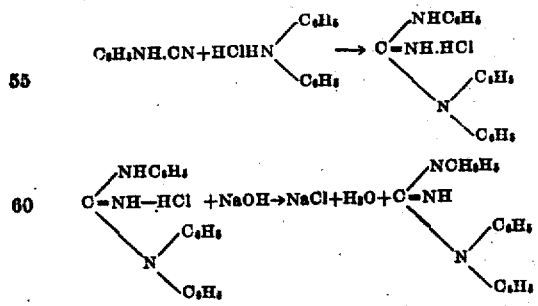

According to Weith & Schroeder, beta triphenyl guanidine is a disubstituted guanidine and contains an imid NH group, as shown by the following tests:—

Beta tri-phenyl guanidine when heated with concentrated hydrochloric acid in a sealed tube 260°–270° C. evolves a gas. On opening the tube it was found to be $CO_2$ with baryta water. The contents of the tube upon extraction with water produced an insoluble substance. This insoluble substance was extracted with ether and proved to be diphenyl amine M. P. 54° C. The water soluble material upon being shaken with ether, separated and evaporated produced a residue from the ether extract which proved to be aniline hydrochloride. The water extract contained ammonium chloride.

Symmetrical tri-phenyl guanidine when treated similarly gives only carbon dioxide and aniline.

In the formula

R has been substituted by the phenyl group $C_6H_5$ in providing the material given in the preferred example above, beta tri-phenyl guanidine. Other aryl radicals such as tolyl, xylyl, cymyl, cumyl, naphthyl or mixtures thereof may be employed to replace one or more of the phenyl groups. It has been found furthermore that zinc oxide may be omitted if desired, although it is a valuable vulcanizing ingredient in the process and the product. It has been found that the temperature and time employed in vulcanization may be considerably varied. The temperatures at which rapid acceleration occurs are, however, above the usual temperature at which rubber is milled and consequently the accelerator shows substantially no tendency to "burn"—prevulcanize—on the mill.

It has been found however, that materials of the type herein discussed, particularly beta triphenylguanidine provide a practical acceleration at temperatures lower than those employed with diphenylguanidine to produce like results. In other words, at 20 pounds per square inch steam pressure, beta triphenylguanidine gives a vulcanized rubber having a much higher tensile strength than does diphenylguanidine. The following comparative results have been obtained by tests at 20 pounds per square inch steam pressure on the same rubber compound containing 100 pounds of rubber, 3 pounds of sulphur, 50 pounds of zinc oxide and 0.75 pounds of accelerator:—

| Accelerator used | 45 minutes tensile elong. | 60 minutes tensile elong. | 75 minutes tensile elong. |
|---|---|---|---|
| Beta triphenylguanidine | 1,650 lbs. 855% | 2,057 lbs. 820% | 2,407 lbs. 800% |
| Diphenylguanidine | 729 lbs. 765% | 1,562 lbs. 830% | 2,075 lbs. 835% |

The fact that a higher tensile strength at a lower steam pressure is secured by using betatriphenylguanidine when compared with diphenylguanidine as indicated by the above table, indicates a characteristic which is important where friction stocks are employed, as for instance, in the manufacture of tires. When such stocks are arranged in plies to form a body of a tire and the tread is then applied and the article so formed is placed in a mold and heated, the heat penetrates to the interior plies relatively slowly and for a considerable portion of a vulcanizing period these interior plies are at a substantially lower temperature than the tread. Under these circumstances it is advisable to have an accelerator which accelerates at a relatively high temperature, say, 40 pounds per square inch steam pressure in the tread, and an accelerator which accelerates at a lower temperature, say, 20 pounds per square inch in the friction stock, so that it is evident that betatriphenylguanidine on account of its ability to accelerate at the lower temperature to produce high tensile strengths is particularly applicable to friction stocks.

It will be observed that in the formula,

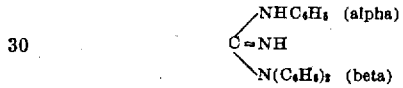

that three of the four hydrogens in the alpha and beta positions have been substituted and may be termed alpha phenyl beta diphenyl guanidine or otherwise for conciseness, beta triphenyl guanidine. If the fourth hydrogen appearing in the alpha position above is substituted by a phenyl group a tetra substituted guanidine having an imid group is obtained which possesses similar accelerating properties to the beta triphenyl guanidine described in the preferred example. It will be understood that when I use the expression in the claims "having at least three hydrogens in the alpha and beta positions substituted", I intend to include such tetra substituted guanidine.

As many apparently widely different embodiments of this invention may be made without departing from the scope thereof, it is to be understood that I do not intend to limit myself to the specific embodiment of the invention herein described, except as indicated in the appended claims.

What I claim is:

1. A process of treating rubber or similar material which comprises combining with the rubber an unsymmetrical tri-substituted guanidine having the formula

as a vulcanizing ingredient and vulcanizing the rubber.

2. A process of treating rubber or similar material which comprises combining with the rubber an unsymmetrical tri-substituted guanidine having the formula

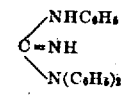

as a vulcanizing ingredient, and vulcanizing the rubber.

3. A process of treating rubber or similar material which comprises combining with the rubber sulphur, an unsymmetrical tri-substituted guanidine having the formula

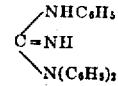

and vulcanizing the rubber.

4. A process of treating rubber or similar material which comprises combining with the rubber sulphur, a zinc compound, such as zinc oxide, an unsymmetrical tri-substituted guanidine having the formula

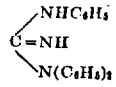

and vulcanizing the rubber.

5. A process of treating rubber or similar material which comprises combining with the rubber a substituted guanidine having an imid group in which at least three of the four remaining hydrogens in the alpha and beta positions are substituted, as a vulcanizing ingredient and vulcanizing the rubber.

6. A process of treating rubber or similar material which comprises combining with approximately 100 pounds of rubber, approximately 50 pounds of zinc oxide, approximately 3 pounds of sulphur and approximately 0.75 pounds of beta tri-phenyl guanidine, and vulcanizing the mixture in a mold at approximately 40 pounds per square inch steam pressure for 45 minutes.

7. As a new product, a vulcanized rubber derived from rubber combined with

as a vulcanizing ingredient.

8. As a new product, a vulcanized rubber derived from rubber combined with

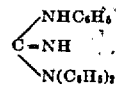

as a vulcanizing ingredient.

9. As a new product, a vulcanized rubber derived from rubber combined with sulphur and

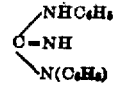

10. As a new product, a vulcanized rubber derived from rubber combined with sulphur, a zinc compound, such as zinc oxide, and an unsymmetrical tri-substituted guanidine having the formula

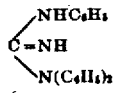

11. A process of treating rubber or similar material which comprises combining rubber compound of zinc, sulphur and beta triphenyl guanidine, and vulcanizing the mixture.

12. As a new product, a vulcanized rubber, derived from rubber combined with a compound of zinc, sulphur, and beta triphenyl guanidine.

Signed at New York, N. Y., this 28th day of July, 1925.

MORRIS L. WEISS.

10. As a new product, a vulcanized rubber derived from rubber combined with sulphur, a zinc compound, such as zinc oxide, and an unsymmetrical tri-substituted guanidine having the formula

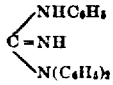

11. A process of treating rubber or similar material which comprises combining rubber compound of zinc, sulphur and beta triphenyl guanidine, and vulcanizing the mixture.

12. As a new product, a vulcanized rubber, derived from rubber combined with a compound of zinc, sulphur, and beta tri-phenyl guanidine.

Signed at New York, N. Y., this 28th day of July, 1925.

MORRIS L. WEISS.

Certificate of Correction

Patent No. 1,616,936, granted February 8, 1927, to

MORRIS L. WEISS.

It is hereby certified that error appears in the printed specification of the above-mentioned patent requiring correction as follows: Page 1, after line 87, strike out the formula and insert instead

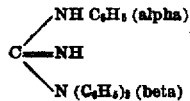

page 3, after line 127, claim 9, strike out the formula and insert instead

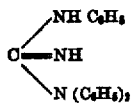

and that the said Letters Patent should be read with this correction therein that the same may conform to the record of the case in the Patent Office.

Signed and sealed this 1st day of March, A. D. 1927.

[SEAL.]
M. J. MOORE,
*Acting Commissioner of Patents.*

Certificate of Correction.

Patent No. 1,616,986, granted February 8, 1927, to

MORRIS L. WEISS.

It is hereby certified that error appears in the printed specification of the above-mentioned patent requiring correction as follows: Page 1, after line 87, strike out the formula and insert instead

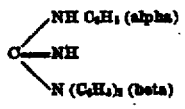

page 3, after line 127, claim 9, strike out the formula and insert instead

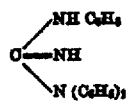

and that the said Letters Patent should be read with this correction therein that the same may conform to the record of the case in the Patent Office.

Signed and sealed this 1st day of March, A. D. 1927.

[SEAL.]
M. J. MOORE,
*Acting Commissioner of Patents.*